(12) United States Patent
Hofmann et al.

(10) Patent No.: US 7,507,684 B2
(45) Date of Patent: Mar. 24, 2009

(54) EXTRUDED MONOLITHIC CATALYTIC CONVERTER AND MANUFACTURING METHOD

(75) Inventors: Lothar Hofmann, Altenkunstadt (DE); Jörg Münch, Lichtenfels (DE); Ralf Dotzel, Nürnberg (DE)

(73) Assignee: Argillon GmbH, Redwitz (DE)

( * ) Notice: Subject to any disclaimer, the term of this patent is extended or adjusted under 35 U.S.C. 154(b) by 248 days.

(21) Appl. No.: 11/647,889

(22) Filed: Dec. 29, 2006

(65) Prior Publication Data

US 2007/0259770 A1   Nov. 8, 2007

(30) Foreign Application Priority Data

May 2, 2006   (DE) ................... 10 2006 020 158

(51) Int. Cl.
*B01J 29/06* (2006.01)

(52) U.S. Cl. .............. 502/60; 502/63; 502/64; 502/65; 502/66; 502/71

(58) Field of Classification Search ........... 502/60, 502/63, 64, 65, 66, 71
See application file for complete search history.

(56) References Cited

U.S. PATENT DOCUMENTS

| | | | |
|---|---|---|---|
| 4,663,300 A | 5/1987 | Lester et al. | |
| 4,735,927 A | 4/1988 | Gerdes et al. | |
| 4,798,813 A | 1/1989 | Kato et al. | |
| 4,910,004 A | 3/1990 | Hamon et al. | |
| 5,116,586 A | 5/1992 | Baacke et al. | |
| 6,569,394 B2 | 5/2003 | Fischer et al. | |
| 2006/0063663 A1* | 3/2006 | Wolff | 502/60 |

FOREIGN PATENT DOCUMENTS

| | | |
|---|---|---|
| DE | 37 22 081 A1 | 1/1988 |
| DE | 39 19 683 A1 | 1/1991 |
| DE | 198 54 502 A1 | 5/2000 |
| EP | 0 299 294 A2 | 1/1989 |
| EP | 0 376 025 A1 | 7/1990 |
| EP | 1 685 891 A1 | 8/2006 |
| WO | 2005/044426 A1 | 5/2005 |

* cited by examiner

*Primary Examiner*—Elizabeth D Wood
(74) *Attorney, Agent, or Firm*—Laurence A. Greenberg; Werner H. Stemer; Ralph E. Locher

(57) ABSTRACT

The invention relates to an extruded solid catalyst body for breaking down nitrogen oxides in the presence of a reducing agent as well as to a process for manufacture of said body. The solid catalyst body has an active material that contains 60 to 87% by weight of an ion-exchanged zeolite containing at least one metal from the group containing Cu, Hf, La, Au, In, V, lanthanoids and transition metals of group VIII of the periodic system, more than 10 to 37% by weight of aluminum oxide and 2 to 10% by weight of inorganic fibers. The solid catalyst body, the active material of which contains a zeolite can be manufactured by extrusion and has a high degree of mechanical stability at a high catalytic activity.

25 Claims, No Drawings

EXTRUDED MONOLITHIC CATALYTIC CONVERTER AND MANUFACTURING METHOD

BACKGROUND OF THE INVENTION

Field of the Invention

The invention relates to an extruded solid catalyst body for breaking down nitrogen oxides in the presence of a reducing agent. The invention further relates to a process for manufacturing said solid catalyst body.

It is known that a catalyst body with an active material which contains titanium dioxide on which the nitrogen oxides, with the aid of a reducing agent, like, in particular, ammonia, and in the presence of oxygen, are converted into molecular nitrogen and water, is suitable for removal of nitrogen oxides in an oxygen-containing exhaust gas, like that of an internal-combustion engine operated with excess air, in particular a diesel engine. Reference hereunto is made to DE 24 58 888 A1. In this process of selective catalytic reduction, in short SCR process, the reducing agent or a precursor substance that will convert to the reducing agent in the exhaust gas, is added to the exhaust gas before entering the catalyst body. Urea, for example, is known as a precursor substance of the reducing agent ammonia and is added to the exhaust gas preferably in the form of an aqueous urea solution.

The ceramic catalyst material of a conventional SCR catalyst body contains titanium oxide as main component and additions of tungsten oxides and/or vanadium oxides. As catalyst bodies, coated carrier catalysts or solid catalysts are used. As concerns coated carrier catalysts, the catalyst material is applied to a support, like especially a cordierite (a magnesium alumino-silicate of composition $Mg_2Al_4Si_5O_{18}$ of a rhombicdipyramidal structure) which in itself is catalytically inactive. A solid catalyst, on the other hand, is made entirely of catalytically active catalyst material. For its manufacture, the starting materials are usually processed into a shapeable slip which is extruded to form a honeycomb body with continuous flow channels. Subsequently, the extruded honeycomb body is calcined to form a solid catalyst body.

Furthermore, zeolites are known components of SCR catalyst bodies. Zeolites, i.e. framework alumino-silicates, partly develop structures of continuous channels, the diameters of which are comparable to those of gas molecules and are particularly suitable for a selective catalytic reduction due to a high specific surface area.

From DE 198 54 502 A1 a SCR catalyst body for breaking down nitrogen oxides in the presence of a reducing agent is known. The active material of the catalyst body described in that document contains titanium dioxide and a zeolite. The zeolite is in this case a hydrogen-ion-exchanged, acid zeolite.

Furthermore, GB 2 193 655 A discloses a catalyst body for breaking down nitrogen oxides using a SCR process. The active material of the catalyst body described in that document contains a titanium dioxide with a small specific surface area and a zeolite that is obtained by ion exchange and contains copper. Mordenite, ZSM-5 and ferrierite are described as preferred zeolites.

Furthermore, EP 0 393 917 A2 discloses a catalyst body for breaking down nitrogen oxides, the active material of which contains a zeolite which, after ion exchange, contains copper and/or iron. USY (Ultra-Stabilized Y), Beta and ZSM-20 are described as preferred zeolites.

Furthermore, EP 0 219 854 A2 discloses a catalyst body which contains titanium dioxide in anatase modification as well as an acid-stable zeolite in hydrogen or ammonium form.

It has been described in the prior art that said catalyst bodies may be produced as coated carrier catalyst bodies as well as solid catalyst bodies.

Finally U.S. Pat. No. 5,271,913 A discloses a catalyst body for breaking down nitrogen oxides using the SCR process, the active material of which body contains a zeolite. The zeolite is in this case impregnated with cerium oxide or an iron oxide. The catalyst body described is said to have a high degree of stability with regard to sulfur components. A zeolite of the ZSM-5 type is described as preferred zeolite.

Compared with coated carrier catalysts, solid catalysts generally display a higher degree of long-term stability concerning catalytic activity. For improvement of the catalytic activity in a SCR catalyst body it is advantageous to use a zeolite. However, prior art has revealed that a SCR solid catalyst body, the active material of which contains a zeolite, suffers from insufficient mechanical stability. Furthermore, the extrusion of the active material containing a zeolite into a honeycomb form is problematic due to lack of free-flow and solidity.

SUMMARY OF THE INVENTION

It is accordingly an object of the invention to provide a SCR solid catalyst body containing a zeolite which can be manufactured by extrusion and which offers the highest possible degree of mechanical stability. Furthermore, it is an object of the invention to describe a process for manufacture of said SCR solid catalyst body.

With the first object in view there is provided, in accordance with the invention, an extruded solid catalyst body for breaking down nitrogen oxides in the presence of a reducing agent the active material of which body contains 60 to 87% by weight of an ion-exchanged zeolite containing at least one metal from the group containing Cu, Hf, La, Au, In, V, lanthanoids and transition metals of group VIII of the periodic system, more than 10 to 37% by weight of aluminum oxide and 2 to 10% by weight of inorganic fibers.

The invention is based on the deliberation that the previously known insufficient degree of mechanical stability of SCR solid catalyst bodies containing a zeolite is conditional on an insufficient combination of the zeolite particles. Extensive examinations have shown that the combination of the zeolite particles can be effected by an aluminum oxide, which practically functions as an inorganic binder. In other words, in the said solid catalyst body the individual zeolite particles are tightly connected over the aluminum oxide. If the active material of said solid catalyst body contains 60 to 87% by weight of the ion-exchanged zeolite, more than 10 to 39% by weight of aluminum oxide and 2 to 10% by weight of inorganic fibers, at sufficient SCR activity said solid catalyst body shows a sufficiently high degree of mechanical stability for long-term application.

With the percentages of weight of zeolite, aluminum oxide and inorganic fibers within the ranges mentioned, the solid catalyst body can be manufactured by extrusion of a suspension of the starting materials. The second object addressing the process for manufacture is achieved, according to the invention, by mixing the starting materials of zeolite, aluminum oxide or a precursor substance of the aluminum oxide, each in powder form, with the inorganic fibers and processing them by mixing and/or kneading in an acid or alkaline aqueous solution into a plastic compound adding, if appropriate, an organic auxiliary agent, extruding the mixture into a catalyst body, drying the catalyst body and calcining said body to form a solid catalyst body at temperatures of between 550 and 650° C., wherein the quantitative proportions of the starting materials are selected in such a way that the solid catalyst body contains 60 to 87% by weight of an ion-exchanged zeolite containing at least one metal from the group containing Cu, Hf, La, Au, In, V, lanthanoids and transition metals of group VIII of the periodic system, more than 10 to 37% by weight of aluminum oxide and 2 to 10% by weight of inorganic fibers.

Said zeolite can be a natural or a synthetic zeolite. It should be noted that the term zeolite is understood as meaning a framework alumino-silicate in which the ratio of the oxygen atoms to the sum of the aluminum and silicon atoms is 2:1. As a result of some silicon atoms of oxidation state IV being exchanged for aluminum atoms of oxidation state III, the framework or framework structure overall acquires a negative charge. This negative charge is compensated for by cations that are in the framework structure and are known as exchangeable cations.

A zeolite is also distinguished by the fact that the framework structure has pores with a characteristic pore width. Zeolites are classified on the basis of the molar ratio of silicon oxide to aluminum oxide or according to the characteristic framework structure resulting from that ratio.

An example of a natural zeolite is mordenite or chabazite. Examples of synthetic zeolites are A-, X and Y zeolites, which represent synthetic forms of mordenite, a ZSM-5 zeolite (trademark for a synthetic zeolite produced by Mobil Oil Company Ltd.), a USY zeolite (Ultra-Stabilized Y) or a beta zeolite. For relevant literature, reference is made to Kirk-Othmer, "Encyclopedia of Chemical Technology", 3rd Edition, Volume 15, John Wiley & Sons, New York, 1981, Pages 640 to 669. For purposes of classification of the zeolites, reference is made to "Chemical Nomenclature and Formulation of Compositions of Synthetic and Natural Zeolites" by R. M. Barrer, Pure Appl. Chem. 51 (1979), pages 1091 to 1100. For information on the structure of zeolites, reference is made to "Zeolith-Atlas: Atlas of Zeolite Framework Types", 5th Edition, Ch. Baerlocher, W. M. Meier and D. H. Olson, Amsterdam, Elsevier (2001).

In a preferred embodiment, the zeolite contains at least one metal from the group containing Fe, Cu, Ce, Hf, La, Pt, Au, In, V, Ir, Ru and Os. These metals contained in the zeolite can provide a high catalytic activity in an adequate temperature range.

For manufacturing said solid catalyst body, the extruded catalyst body with continuous channels can be dried at a temperature of between 20° and 100° C. However, drying can also be carried out via microwave or freeze drying.

Both ceramic fibers and glass fibers can be used as inorganic fibers. It is advantageous to use glass fibers for reasons of economy.

As organic auxiliaries the conventional binders, fillers, lubricants and plasticizers known in the ceramic industry can be used, which are "burnt out" during calcination. Cellulose is especially suitable as binder and filler. A water-soluble resin is particularly suitable for admixture as organic plasticizer. The admixture of cellulose increases the porosity advantageous for the catalytic activity of the solid catalyst body, as the cellulose initially swells in the aqueous suspension but dissolves completely during the calcining process. The organic plasticizer is used to improve the extrudability of the aqueous suspension. A polyethylenoxide or polyethylene glycole polymer, for example, is suitable as a water-soluble resin.

It has been shown that the mixture of the starting materials in an acid or alkaline aqueous solution is advantageous for combining the individual particles. It is especially advantageous in order to obtain the free-flow ability desired for extrusion of the starting compound. The extrudability of the starting compound is particularly improved if the starting materials are processed in an acetous solution with a pH-value between 3 and 4 or in an ammoniacal solution with a pH-value between 8 and 9.

An especially favorable binding effect of the extruded solid catalyst body can be obtained if the aluminum oxide acting as inorganic binder is a $\gamma$-$Al_2O_3$. $\gamma$-$Al_2O_3$ is understood as being a face-centered cubic crystal aluminum oxide.

The aluminum oxide necessary for combining the zeolite particles can be obtained primarily by using a precursor substance in the starting materials. Said precursor substance is converted or changed during the manufacturing process to the aluminum oxide required for combining the zeolite particles. Said precursor substance can be, for example, an aluminum hydroxide, i.e. a boehmite, a gibbsite or a bayerite. It is especially advantageous to use a boehmite as precursor substance for the aluminum oxide, the basic structure of which matches the structure of the zeolite particles very well. A boehmite is understood to be the orthorhombic structure of an aluminum meta-hydroxide AlO(OH). Under the conditions prevalent during manufacture of the solid catalyst body, the boehmite converts to a $\gamma$-$Al_2O_3$.

It is advantageous for the catalytic activity of the solid catalyst body to obtain a maximum proportion of zeolite. However, this inevitably entails a proportional decrease of the aluminum oxide responsible for mechanical stability. In order to achieve a high degree of catalytic activity at a satisfactory mechanical stability, it is advantageous if the active material of the solid catalyst body contains 70 to 85% by weight of zeolite and 12 to 25% by weight of aluminum oxide.

As is known, the stability of the zeolite increases with the increase of the molar ratio of silicon oxide to aluminum oxide. It is advantageous for the mechanical stability of the extruded solid catalyst body if the zeolite used is a zeolite with a molar ratio of silicon oxide to aluminum oxide of 10 to 50.

The ion-exchanged zeolite with the named elements shows a sufficiently high degree of SCR activity. The solid catalyst body shows a particularly high degree of SCR activity if the zeolite contains iron, copper and/or cerium. It is advantageous if the ion-exchanged zeolite is a zeolite containing iron, wherein the zeolite material contains 1 to 9% by weight of iron. In this connection, approx. 1% by weight of the iron is bound to the zeolite by ion exchange while the remaining share of the iron is attached to the zeolite due to its open pore structure. This, in a way, free iron favorably increases the mechanical stability of the zeolite and consequently that of the solid catalyst body and also improves its acid resistance. Therefore, a solid catalyst body containing said zeolite is suitable for breaking down nitrogen oxides particularly in sulfur-containing exhaust gases. The high iron content in the zeolite can be obtained by pressure setting during iron addition, for example by means of an iron nitrate solution. Also a solid state insertion, or solid state ion exchange respectively, using iron sulfate is possible, as described, for example, in DE 198 20 515 A1. It has also been shown that a high iron content further improves the SCR activity at high exhaust gas temperatures.

Due to their continuous channels, the diameters of which are comparable to those of gas molecules, a faujasite, a ferrierite, a Y-, Beta, ZSM-5, ZSM-20 or a MCM-41 zeolite are particularly suitable as zeolite for the extruded solid catalyst body. It is advantageous if the zeolite is a zeolite of type ZSM-5 or Beta. These zeolites display a structure and surface character suitable for the SCR reaction. Particularly when using a boehmite as precursor substance of the aluminum oxide, zeolite particles of this type show good combination qualities.

In a further version the active material of the catalyst body contains additionally up to 5% by weight of at least one element of the group containing Cu, Hf, La, Au, V, Mn, lanthanoids and transition metals of group VIII of the periodic system, which are bound to the aluminum oxide. In particular, the elements shall be chosen from a group containing Fe, Cu, Au, V, Mn, Hf, La, Ir, Ru, Os and In. The additional elements are bound to the inorganic binder so that the latter obtains the additional functionality of catalytic activity. This further improves the catalytic activity of the solid catalyst body. In principle, an addition of these elements to or at the aluminum oxide can be effected by admixing, for example, a solution of water-soluble salts of said metals when producing the mixture of the starting materials. For example, an iron nitrate solution can be used for adding iron.

To ensure the binding with the aluminum oxide, it is advantageous to add an aqueous solution of a water-soluble metal salt to the aluminum oxide or the precursor substance of the aluminum oxide before adding the other starting materials.

DESCRIPTION OF THE PREFERRED EMBODIMENTS

The two versions of the invention are specified in the following two examples:

EXAMPLE 1

An ion-exchanged, synthetic ZSM-5 zeolite, the active material of which contains 5% by weight of iron, is selected as zeolite. The powdered ZSM-5 zeolite is mixed with glass fibers and likewise powdered synthetic boehmite and is processed in an acetous aqueous solution with a pH-value of 3.5 into a shapeable and flowable slip by admixture of cellulose, the plasticizer Zusoplast (a brand name of Zschimmer & Schwarz GmbH & Co KG) and the organic auxiliary agent Polyox (a brand name of Dow Chemicals). The quantitative proportions of the starting materials are selected in such a way that the active material of the finished solid catalyst body contains 71% by weight of zeolite, 24% by weight of $\gamma$-$Al_2O_3$ and 5% by weight of glass fibers. The shapeable mixture is extruded into a honeycomb catalyst body with continuous channels and with a round cross-section exhibiting a cell density of 300 cpsi (cells per square inch). Subsequently, the catalyst body is dried at a temperature of 90° C. and calcined to form a solid catalyst body at a temperature of 600°. The finished solid catalyst body has an inflow area with a diameter of approximately 14 cm and a flow-through length of approximately 19 cm.

Three of the solid catalyst bodies produced in said way are disposed in parallel in the exhaust gas stream of a diesel engine of a commercial vehicle with exhaust turbosupercharging. The diesel engine concerned has a displacement of 12 l at a power of maximum 300 kW. Depending on different operation conditions, the exhaust gas of the diesel engine shows an oxygen content of between 3 and 15%, a water content of between 4 and 12% and a carbon dioxide content of between 4 and 12%. Under various typical operation conditions of the diesel engine, the catalytic conversion of nitrogen oxides over the disposed solid catalyst bodies is measured as nitrogen oxide concentration upstream and downstream of the catalyst body at various temperatures and varying metered addition of ammonia.

For results, please refer to Table 1:

TABLE 1

| Temperature in ° C. | Conversion 1 in % | Conversion 2 in % | $NO_x$-Concentration in ppm |
|---|---|---|---|
| 230 | 79 | 86 | 304 |
| 312 | 81 | 92 | 1017 |
| 312 | 63 | 61 | 565 |
| 401 | 68 | 82 | 1370 |
| 512 | 46 | 68 | 1372 |
| 690 | 50 | 73 | 964 |

Measurement of Conversion 1 with an over-stoichiometric addition of ammonia according to nitrogen oxide concentration was made showing 10 ppm residual ammonia in the exhaust gas downstream of the solid catalyst. Conversion 2 with an over-stoichiometric addition showed a concentration of residual ammonia of 50 ppm. The $NO_x$ concentration in the exhaust gas corresponding to the respective operation condition of the diesel engine is displayed in the right column.

A high conversion of nitrogen oxides can be found at a temperature range of the exhaust gas of approximately 200° C. to 400° C. Even at high temperatures a reduction of nitrogen oxides by approximately 50% and by approximately 70% at a lower, or higher over-stoichiometric, addition of ammonia is achieved.

The solid catalyst body according to Example 1 displays a high degree of mechanical stability. Despite the high zeolite proportion the shapeable slip of the starting materials can be easily extruded into a catalyst body, wherein the extruded catalyst body possesses the stability necessary for further processing.

EXAMPLE 2

Yet another solid catalyst is manufactured according to Example 1. However, instead of an ion-exchanged ZSM-5 zeolite an ion-exchanged beta zeolite is used as zeolite. The beta zeolite contains 5% by weight of iron. The starting materials are admixed according to Example 1 in such a way that the finished solid catalyst contains 60% by weight of the beta zeolite, 5% by weight of glass fibers and 35% by weight of the aluminum oxide.

A model exhaust gas of a defined composition is passed over the calcined solid catalyst body. Exhaust gas conditions according to typical operation conditions of an internal-combustion engine are simulated. In addition to the nitrogen the model exhaust gas contains 900 ppm NO at high exhaust gas temperatures and is passed over the catalyst body with a high volume flow. At lower exhaust gas temperatures, 600 ppm NO is added, whereas the exhaust gas is passed over the solid catalyst body at a lower volume flow. The model exhaust gas also contains unchanged proportions of 10% by volume of oxygen and 7% by volume of water. The model gas further contains ammonia at a ratio of NO to $NH_3$ of 0.9. The model gas is passed over the solid catalyst body at altogether 6 different temperatures. The catalytic conversion by the solid catalyst body is measured as the concentration ratio of NO upstream and downstream of the solid catalyst body in the exhaust gas. For results, please refer to Table 2.

TABLE 2

| Volume Flow in m³/h | Conc. NO in ppm | Temperature in ° C. | Conversion NO in % |
|---|---|---|---|
| 3.7 | 900 | 550 | 78.5 |
| 3.7 | 900 | 475 | 80.3 |
| 3.7 | 900 | 400 | 79.3 |
| 3.7 | 900 | 325 | 62.9 |
| 1.5 | 600 | 250 | 49.3 |
| 1.5 | 600 | 200 | 22.5 |

As can be seen from Table 2, the solid catalyst according to Example 2 shows a high conversion rate in the temperature range beyond 300° C. At very low temperatures of the exhaust gas, the catalytic activity decreases. However, even at 200° C. more than 20% of the contained NO is converted. Special attention shall be paid to the fact that the activity of the solid catalyst body is considerably increased by adding $NO_2$ to the model exhaust gas. The measured activities represent minimum activities concerning the conversion of NO.

We claim:

1. An extruded solid catalyst body for breaking down nitrogen oxides in the presence of a reducing agent, the catalyst body comprising:
   active material containing 60 to 87% by weight of an ion-exchanged zeolite, said zeolite containing at least one metal selected from the group consisting of Cu, Hf, La, Au, In, V, lanthanides, and transition metals of the group VIII of the periodic system, more than 10% and up to 37% by weight of aluminum oxide, and 2 to 10% by weight of inorganic fibers.

2. The solid catalyst body according to claim 1, wherein said zeolite contains at least one metal selected from the group consisting of Fe, Cu, Ce, Hf, La, Pt, Au, In, V, Ir, Ru, and Os.

3. The solid catalyst body according to claim 1, wherein said aluminum oxide is a $\gamma$-$Al_2O_3$.

4. The solid catalyst body according to claim 1, wherein said aluminum oxide is formed by admixture of an aluminum hydroxide with other starting materials.

5. The solid catalyst body according to claim 4, wherein said aluminum hydroxide is a boehmite.

6. The solid catalyst body according to claim 1, wherein said active material contains 70 to 85% by weight of said zeolite and 12 to 25% by weight of said aluminum oxide.

7. The solid catalyst body according to claim 1, wherein said zeolite has a molar ratio of silicon oxide to aluminum oxide of 10 to 50.

8. The solid catalyst body according to claim 1, wherein said zeolite is an ion-exchanged zeolite containing Fe, wherein a zeolite material contains between 1 and 9% by weight of Fe.

9. The solid catalyst body according to claim 1, wherein said zeolite is a ZSM-5 or Beta type zeolite.

10. The solid catalyst body according to claim 1, wherein said active material contains additionally up to 5% by weight of at least one element selected from the group consisting of Cu, Hf, La, Au, V, Mn, lanthanides, and transition metals of the group VIII of the periodic system of elements.

11. The solid catalyst body according to claim 10, wherein said active material contains of at least one element selected from the group consisting of Fe, Cu, Au, V, Mn, Hf, La, Ir, Ru, Os, and In, bound to said aluminum oxide.

12. A process of manufacturing a solid catalyst body, the process which comprises:
   mixing starting materials of a zeolite and of an aluminum oxide or a precursor substance of the aluminum oxide, each in powder form, with inorganic fibers;
   optionally adding an organic auxiliary agent;
   processing by mixing and/or kneading in an acid or alkaline aqueous solution into a plastic compound to form a mixture;
   extruding the mixture into a catalyst body, drying the catalyst body and calcining at a temperature between 550 and 650° C. to form a solid catalyst body; and
   selecting quantitative proportions of the starting materials such that the solid catalyst body contains 60 to 87% by weight of an ion-exchanged zeolite containing at least one metal selected from the group consisting of Cu, Hf, La, Au, In, V, lanthanides, and transition metals of group VIII of the periodic system, more than 10% and up to 37% by weight of aluminum oxide, and 2 to 10% by weight of the inorganic fibers.

13. The process according to claim 12, which comprises selecting the quantitative proportions of the starting materials such that the solid catalyst body contains 60 to 87% by weight of the ion-exchanged zeolite containing at least one metal selected from the group consisting of Fe, Cu, Ce, Hf, La, Pt, Au, In, V, Ir, Ru, and Os.

14. The process according to claim 12, which comprises adding an aluminum hydroxide as a precursor substance.

15. The process according to claim 14, which comprises adding boehmite as the precursor substance.

16. The process according to claim 12, wherein the quantitative proportions of the starting materials are selected in such a way that the solid catalyst body contains 70 to 85% by weight of zeolite and 12 to 25% by weight of aluminum oxide.

17. The process according to claim 12, wherein the zeolite is a zeolite with a molar ratio of silicon oxide to aluminum oxide of 10 to 50.

18. The process according to claim 12, wherein the zeolite is an ion-exchanged zeolite containing Fe, wherein the zeolite material contains between 1 and 9% by weight of Fe.

19. The process according to claim 12, wherein the zeolite is a ZSM-5 or Beta type zeolite.

20. The process according to claim 12, which comprises mixing the starting materials with a solution of at least one of the elements from the group consisting of Cu, Hf, La, Au, V, Mn, lanthanides, and transition metals of group VIII of the periodic system of elements, to cause the solid catalyst body to contain up to 5% by weight of these elements.

21. The process according to claim 20, which comprises mixing the starting materials with a solution of at least one of the elements from the group consisting of in particular Fe, Cu, Au, V, Mn, Hf, La, Ir, Ru, Os and In, in the form of their salts.

22. The process according to claim 20, which comprises first admixing the aluminum oxide with the solution and subsequently admixing the zeolite and the inorganic fibers.

23. The process according to claim 12, which comprises admixing cellulose and/or an organic plasticizer as an organic auxiliary agent.

24. The process according to claim 12, which comprises admixing a water-soluble resin as an organic auxiliary agent.

25. The process according to claim 12, which comprises processing the starting materials in an acetous solution with a pH-value between 3 and 4 or in an ammoniac solution with a pH-value between 8 and 9.

* * * * *